United States Patent
Guo et al.

(10) Patent No.: US 11,820,936 B2
(45) Date of Patent: Nov. 21, 2023

(54) SCOUR-RESISTANT INTERFACE ENHANCER USED FOR WELL CEMENTING OF COALBED METHANE WELLS, PREPARATION METHOD, AND APPLICATION

(71) Applicants: CHINA UNIVERSITY OF PETROLEUM (EAST CHINA), Qingdao (CN); Guizhou Engineering Research Institute of Oil & Gas Exploration and Development, Guiyang (CN)

(72) Inventors: Shenglai Guo, Qingdao (CN); Yuhuan Bu, Qingdao (CN); Chang Lu, Qingdao (CN); Lingyun Zhao, Qingdao (CN); Yuanlong Wei, Qingdao (CN); Qi Zhao, Qingdao (CN); Huajie Liu, Qingdao (CN); Qiang Wang, Qingdao (CN); Xinyang Guo, Qingdao (CN)

(73) Assignees: CHINA UNIVERSITY OF PETROLEUM (EAST CHINA), Qingdao (CN); Guizhou Engineering Research Institute of Oil & Gas Exploration and Development, Guiyang (CN)

( * ) Notice: Subject to any disclaimer, the term of this patent is extended or adjusted under 35 U.S.C. 154(b) by 0 days.

(21) Appl. No.: 18/097,190

(22) Filed: Jan. 13, 2023

(65) Prior Publication Data
US 2023/0227710 A1    Jul. 20, 2023

(30) Foreign Application Priority Data
Jan. 14, 2022   (CN) .......................... 202210042635.2

(51) Int. Cl.
*C09K 8/584*    (2006.01)
*C09K 8/487*    (2006.01)

(52) U.S. Cl.
CPC .............. *C09K 8/487* (2013.01); *C09K 8/584* (2013.01)

(58) Field of Classification Search
CPC ............. C09K 8/42; C09K 8/57; C09K 8/584
See application file for complete search history.

(56) References Cited

U.S. PATENT DOCUMENTS

| 5,531,993 A | * | 7/1996 | Griat | A61K 8/9794 |
| | | | | 514/939 |
| 6,180,689 B1 | | 1/2001 | Moulin | |
| 2006/0019836 A1 | * | 1/2006 | Li | C09K 8/68 |
| | | | | 507/240 |

FOREIGN PATENT DOCUMENTS

CN    112521924 A    3/2021

OTHER PUBLICATIONS https://www.nanotrun.com/caeo-15-coconut-amide-ethoxylates-cas-61791-08-0-p00573p1.html (Year: 2023).*
Wang Chengwen, et al., Bonding-strengthening technology in coalbed cementing through wettability im-provement, Natur. Gas Ind., 2017, pp. 83-88, vol. 37 No.7.
Wang Li, et al., Study on bonding strength performances and improved method of coalbed methane well cementation in coal reservoir, Coal Science and Technology, 2019, pp. 59-64, vol. 47, No. 2.

* cited by examiner

*Primary Examiner* — Aiqun Li
(74) *Attorney, Agent, or Firm* — Bayramoglu Law Offices LLC

(57) ABSTRACT

A scour-resistant interface enhancer, a preparation method, and an application thereof are provided. The scour-resistant interface enhancer is a compound solution prepared by using a 0.1% surfactant CAEO-15 and a 0.3% silane coupling agent as solutes and using clear water and absolute ethanol as solvents, where the mass ratio of clear water to absolute ethanol is 9:1. The scour-resistant interface enhancer of the present invention used as pre-flush for well cementing of coalbed methane wells has good wettability modification effect, shows scour-resistant effect against cement slurry, exhibits good compatibility with cement slurry system, and can significantly improve the cementing strength and air tightness of two interfaces of coal bed and effectively enhance the cementing quality of coalbed methane wells.

3 Claims, No Drawings

SCOUR-RESISTANT INTERFACE ENHANCER USED FOR WELL CEMENTING OF COALBED METHANE WELLS, PREPARATION METHOD, AND APPLICATION

CROSS REFERENCE TO THE RELATED APPLICATIONS

This application is based upon and claims priority to Chinese Patent Application No. 202210042635.2, filed on Jan. 14, 2022, the entire contents of which are incorporated herein by reference.

TECHNICAL FIELD

The present invention belongs to the fields of oil and gas well cementing and oilfield chemistry and specifically relates to a scour-resistant interface enhancer, a preparation method, and an application.

BACKGROUND

Energy is the foundation of world economic and social development. China is a country rich in coal resources with the amount of coalbed methane resources being comparable to that of conventional natural gas resources and having abundant reserves. Coalbed methane is non-polluting and has high calorific value, so it has a very broad application prospect as a new energy.

The development and utilization of coalbed methane, which is a new energy, can solve the major problem of energy shortage and meanwhile play a role in reducing disasters and improving the earth's atmospheric environment. However, there are still many problems existing in the exploitation of coalbed methane. In terms of the composition and structural characteristics of a coal bed itself, the coal bed is an organic rock, which has a low cementing strength with inorganic cement slurry and shows a poor cementing quality, resulting in gas accidents, the easy collapse of the wall of the well, large leakage, small extraction volume, and pollution to the formation. The safe and efficient development of coalbed methane requires the drilling of lots of coalbed methane wells and the stimulation techniques such as fracturing. The particularity of coal bed and the risk of damage of coalbed methane well fracturing to the wellbore integrity of coalbed methane wells determine that the well cementing of coalbed methane wells is one of the key issues affecting the safe and efficient development of coalbed methane.

Due to the contradiction between the lipophilicity of the coal bed surface and the hydrophilicity of cement slurry, the cementing quality of the two interfaces during coalbed cementing is poor. Wettability modification of the coal bed surface becomes one of the keys to improving the cementing quality of two interfaces. However, after the coal bed surface is subjected to the wettability modification with pre-flush, the secondary impact of the displacement and scouring of the cement slurry on the wettability of the coal bed surface needs to be further explored.

SUMMARY

The objective of the present invention is to provide a scour-resistant interface enhancer and its preparation method and application. The enhancer is applied to the well cementing of coalbed methane wells, which can modify the surface of coal rocks from oil-wet to completely water-wet. Moreover, the surface of coal rocks can still maintain water-wet characteristics after being scoured by cement slurry. Coal rocks treated with this enhancer show a significantly improved cementing quality between the two interfaces.

The scour-resistant interface enhancer of the present invention is a compound solution prepared by using a surfactant CAEO-15 and a silane coupling agent as solutes and using a mixture of clear water and absolute ethanol as a solvent.

The mass percentage of the surfactant CAEO-15 is 0.1%; the mass percentage of the silane coupling agent is 0.3%.

The mass ratio of clear water:absolute ethanol is 9:1.

In the present invention, the surfactant CAEO-15 increases the wettability modification effect on the coal rock surface and allows the coal rock surface to be completely water-wet. The silane coupling agent increases the scour-resistance effect of the coal rock surface so that the coal rock surface can stay water-wet after being scoured by cement slurry. Absolute ethanol provides a stable environment for the silane coupling agent, and the addition of appropriate ethanol to water can ensure the effective hydrolysis of the silane coupling agent to produce silanol and prevent the reverse reaction of the generated silanol.

A preparation method of the scour-resistant interface enhancer of the present invention includes the specific steps:

(1) mixing clear water and absolute ethanol in proportion to obtain a solution I;

(2) adding a surfactant CAEO-15 to solution I, adding a silane coupling agent dropwise under a low-speed stirring, and continuing the low-speed stirring for 15 min to obtain the scour-resistant interface enhancer. The speed of adding the silane coupling agent should not be too fast, otherwise, a polycondensation reaction easily occurs due to the aggregation of a large amount of silane coupling agent, which will affect the reaction of producing silanol from the silane coupling agent and affect the actual effect.

The scour-resistant interface enhancer described in the present invention is applied to the well cementing of coalbed methane wells. The scour-resistant interface enhancer has an obvious improvement effect on the cementing quality between two interfaces of the coal bed, as well as on the shear strength and the air tightness of two interfaces of the coal bed. Furthermore, the scour-resistant interface enhancer of the present invention has good compatibility with cement slurry.

DETAILED DESCRIPTION OF THE EMBODIMENTS

Embodiment 1

A plurality of small coal samples is taken from coal blocks on site. The upper and lower surfaces of each coal sample are polished with low-mesh sandpaper. The upper surface of each coal sample is smoothed with high-mesh sandpaper for wetting angle measurement.

Embodiment 2

(1) Emulsifiers OP-10 in different concentrations are respectively dissolved in clear water and stirred slowly for 15 min to obtain multiple solutions I.

(2) Peregal O-25 in different concentrations are respectively dissolved in clear water and stirred slowly for 15 min to obtain multiple solutions 2.
(3) Surfactants CAEO-15 in different concentrations are respectively dissolved in clear water and stirred slowly for 15 min to obtain multiple solutions 3.
(4) Coconut diethanolamide in different concentrations are respectively dissolved in clear water and stirred slowly for 15 min to obtain multiple solutions solution 4.
(5) Tween 60 in different concentrations are respectively dissolved in clear water and stirred slowly for 15 min to obtain multiple solutions 5.
(6) Sodium lauryl sulfate in different concentrations are respectively dissolved in clear water and stirred slowly for 15 min to obtain multiple solutions 6.
(7) Octadecyltrimethylammonium chloride in different concentrations are respectively dissolved in clear water and stirred slowly for 15 min to obtain multiple solutions 7.

The concentration is the mass ratio of surfactant to clear water.

Embodiment 3

(1) Clear water and absolute ethanol are mixed to obtain a solution 1.
(2) Surfactant CAEO-15 is added to the solution 1 and stirred at a low speed, silane coupling agent is dropwise added under the low-speed stirring, and the low-speed stirring is conducted for 15 min to yield the product.

The mass ratio of the clear water to the absolute ethanol is 9:1.

The concentration of the surfactant CAEO-15 is 0.1%.

The concentration of the silane coupling agent is 0.3%.

Comparative Example 1

The wetting angle of the surface of coal samples from different on-site blocks is tested. The experimental instrument used is an optical contact angle/interfacial tension meter, and the titration liquid used is distilled water and cement slurry filtrate. The wetting angle is an average value of three points measured. Table 1 shows that the wetting angle of the surface of the coal samples from each block is greater than 90°, exhibiting lipophilicity, and the measurement results obtained by titration with cement slurry filtrate are slightly less than those obtained by titration with distilled water. To simulate the site, the wetting angle is measured by titration with cement slurry filtrate in a subsequent process.

TABLE 1

Wetting angle of coal samples from different blocks

| Coal sample | Average wetting angle (°) | | | |
|---|---|---|---|---|
| | Riverside 1# | Riverside 13# | Wangjiazhai 7# | Naluozhai 1# |
| Wetting angle measured by titration with distilled water | 98.0 | 113.2 | 118.6 | 111.8 |
| Wetting angle measured by titration with cement slurry filtrate | 90.3 | 105.4 | 109.7 | 103.9 |

Experimental Example 1

The wettability modification effect of various surfactants on the surface of coal rocks is tested. The coal samples are soaked in seven kinds of surfactants each with different concentrations for 10 min and then taken out and air-dried to measure the surface wetting angle.

TABLE 2

Optimal concentration of emulsifier OP-10

| Dry coal sample | Concentration/% | | | | | | | |
|---|---|---|---|---|---|---|---|---|
| | 0.1 | 0.2 | 0.3 | 0.4 | 0.5 | 0.6 | 0.7 | 0.8 |
| Wetting angle/° | 107.3 | 63.9 | 55.7 | 57.3 | 31.1 | 26.9 | 30.9 | 33.8 | 35.1 |

TABLE 3

Optimal concentration of Peregal O-25

| Dry coal sample | Concentration/% | | | | | | | |
|---|---|---|---|---|---|---|---|---|
| | 0.02 | 0.04 | 0.06 | 0.08 | 0.1 | 0.2 | 0.3 | 0.4 |
| Wetting angle/° | 110.1 | 86.7 | 86.0 | 53.2 | 38.0 | 9.6 | 16.3 | 26.3 | 38.6 |

TABLE 4

Optimal concentration of CAEO-15

| Dry coal sample | Concentration/% | | | | | | | |
|---|---|---|---|---|---|---|---|---|
| | 0.02 | 0.04 | 0.06 | 0.08 | 0.1 | 0.2 | 0.3 | 0.4 |
| Wetting angle/° | 111.3 | 57.9 | 44.8 | 38.6 | 15.6 | 0.0 | 0.0 | 16.2 | 26.7 |

TABLE 5

Optimal concentration of coconut diethanolamide

| Dry coal sample | Concentration/% | | | | | | | |
|---|---|---|---|---|---|---|---|---|
| | 0.1 | 0.2 | 0.22 | 0.24 | 0.26 | 0.3 | 0.4 | 0.5 |
| Wetting angle/° | 106.2 | 42.1 | 14.7 | 6.9 | 6.4 | 0.0 | 0.0 | 0.0 | 0.0 |

TABLE 6

Optimal concentration of Tween 60

| Dry coal sample | Concentration/% | | | | | | | |
|---|---|---|---|---|---|---|---|---|
| | 0.02 | 0.04 | 0.06 | 0.08 | 0.1 | 0.2 | 0.3 | 0.4 |
| Wetting angle/° | 106.3 | 56.5 | 51.0 | 36.6 | 19.7 | 0.0 | 0.0 | 20.7 | 28.5 |

TABLE 7

Optimal concentration of sodium lauryl sulfate

| Dry coal sample | Concentration/% | | | | | | | |
|---|---|---|---|---|---|---|---|---|
| | 0.02 | 0.04 | 0.06 | 0.08 | 0.1 | 0.2 | 0.3 | 0.4 |
| Wetting angle/° | 108.9 | 40.5 | 24.4 | 9.9 | 15.7 | 24.0 | 29.3 | 30.5 | 31.2 |

TABLE 8

Optimal concentration of octadecyltrimethylammonium chloride

| Dry coal sample | Concentration/% | | | | | | | |
|---|---|---|---|---|---|---|---|---|
| | 0.05 | 0.07 | 0.1 | 0.13 | 0.15 | 0.2 | 0.3 | 0.4 |
| Wetting angle/° | 109.1 | 36.2 | 17.3 | 10.5 | 2.0 | 8.2 | 8.8 | 11.5 | 15.7 |

It can be seen from Table 2 to Table 8 that the seven kinds of surfactants can all have a good wettability modification effect, making the surface of the coal sample change from oil-wet to water-wet. Considering the price of surfactants and the optimal concentration for wettability modification, the preferred surfactant is CAEO-15, and its optimal concentration is 0.1%.

Experimental Example 2

The scour-resistant performance after wettability modification with surfactant is tested. The coal samples from the same block are respectively soaked in a 0.1% CAEO-15 solution, a 0.3% silane coupling agent solution, and a compound solution of 0.1% CAEO-15 and 0.3% silane coupling agent for 10 min, followed by taking out, air-drying, and scouring with a cement slurry filtrate at a constant flow rate of 0.42 m/s. The wetting angle of the surface of the coal sample is measured after scouring for different durations of time.

TABLE 9

Scour-resistant effect after wettability modification with CAEO-15 solution

| Dry coal sample | Wettability modification | Scouring time | | | | | |
|---|---|---|---|---|---|---|---|
| | | 5 s | 30 s | 2 min | 5 min | 15 min | 30 min |
| Wetting angle/° | 112.8 | 0.0 | 17.9 | 28.3 | 55.2 | 77.1 | 86.3 | 91.2 |

TABLE 10

Scour-resistant effect after wettability modification with silane coupling agent solution

| Dry coal sample | Wettability modification | Scouring time | | | | | |
|---|---|---|---|---|---|---|---|
| | | 5 s | 30 s | 2 min | 5 min | 15 min | 30 min |
| Wetting angle/° | 111.3 | 30.7 | 37.1 | 42.3 | 55.2 | 62.5 | 66.6 | 70.0 |

TABLE 11

Scour-resistant effect after wettability modification with compound solution

| Dry coal sample | Wettability modification | Scouring time | | | | | |
|---|---|---|---|---|---|---|---|
| | | 5 s | 30 s | 2 min | 5 min | 15 min | 30 min |
| Wetting angle/° | 112.3 | 0.0 | 10.2 | 15.0 | 19.8 | 24.6 | 26.3 | 27.9 |

It can be seen from Table 9 to Table 11 that the CAEO-15 solution can modify the surface of the coal sample to be completely water-wet, but the wetting angle returns to 91.2° after being scoured by the cement slurry filtrate for 30 min, indicating that its wettability modification effect is good but the scour-resistant effect is poor. The silane coupling agent solution cannot modify the surface of the coal sample to be completely water-wet, but the wetting angle remains at 70.0° after being scoured by the cement slurry filtrate for 30 min, indicating that its wettability modification effect is poor but the scour-resistant effect is good. The compound solution can modify the surface of the coal sample to be completely water-wet, and the wetting angle remains at 27.9° after being scoured by the cement slurry filtrate for 30 min, indicating that its wettability modification effect and scour-resistant effect are both very good. The compound solution is a scour-resistant interface enhancer.

Experimental Example 3

The compatibility test of the scour-resistant interface enhancer and the cement slurry is carried out. The cement slurry is prepared according to the following formula: 40% G-grade oil well cement+30% slag (S140)+30% sinking bead fly ash+1.5% thixotropic agent+2.5% fluid loss reducer+4% anhydrous sodium sulfate, and the water-solid ratio is 0.6. The scour-resistant interface enhancer is mixed with the cement slurry in a certain volume ratio, and the effects of the scour-resistant interface enhancer on the rheology, filter loss, thickening of the cement slurry, and the compressive strength of set cement are measured, respectively.

TABLE 12

Effects of scour-resistant interface enhancer on rheological parameters of cement slurry

| No. | Mixing ratio (enhancer:cement slurry) | Φ600 | Φ300 | Φ200 | Φ100 | Φ6 | Φ3 | n | K |
|---|---|---|---|---|---|---|---|---|---|
| 1 | 0:100 | 120 | 65 | 46 | 26 | 2 | 1 | 0.884 | 0.134 |
| 2 | 5:95 | 112 | 60 | 44 | 24 | 2 | 1 | 0.900 | 0.112 |
| 3 | 10:90 | 104 | 55 | 40 | 22 | 2 | 1 | 0.919 | 0.091 |
| 4 | 15:85 | 80 | 42 | 32 | 20 | 2 | 1 | 0.929 | 0.065 |
| 5 | 20:80 | 68 | 36 | 26 | 18 | 2 | 1 | 0.917 | 0.060 |
| 6 | 25:75 | 56 | 29 | 20 | 14 | 2 | 1 | 0.949 | 0.040 |

TABLE 13

Effects of scour-resistant interface enhancer on thickening time of cement slurry

| | Mixing ratio (enhancer:cement slurry) | | | | | | |
|---|---|---|---|---|---|---|---|
| | 0:100 | 2:98 | 4:96 | 6:94 | 8:92 | 10:90 | 12:88 |
| Thickening time/min | 360 | 360 | 380 | 380 | 390 | 410 | 440 |

TABLE 14

Effects of scour-resistant interface enhancer on water loss of cement slurry

| | Mixing ratio (enhancer:cement slurry) | | | | | |
|---|---|---|---|---|---|---|
| | 0:100 | 2:98 | 4:96 | 6:94 | 8:92 | 10:90 |
| API water loss | 40 | 40 | 42 | 42 | 44 | 48 |

TABLE 15

Effects of scour-resistant interface enhancer on compressive strength of set cement

| Mixing ratio (enhancer:cement slurry) | Compressive strength/MPa | | |
|---|---|---|---|
| | 24 h | 48 h | 72 h |
| 0:100 | 13.760 | 14.268 | 14.937 |
| 5:95 | 12.932 | 13.526 | 14.022 |
| 10:90 | 10.107 | 10.826 | 11.298 |

It can be seen from Table 12 to Table 15 that the scour-resistant interface enhancer has little effect on the rheological parameters, API water loss, thickening time of cement slurry, and the compressive strength of set cement, indicating that the scour-resistant interface enhancer has good compatibility with cement slurry.

Experimental Example 4

The effect of the scour-resistant interface enhancer on the cementing quality of two interfaces of coal bed is tested. The cement slurry is prepared according to the following formula: 40% G-grade oil well cement+30% slag (S140)+30% sinking bead fly ash+1.5% thixotropic agent+2.5% fluid loss reducer+4% anhydrous sodium sulfate, and the water-solid ratio is 0.6. Coal cores are respectively soaked in the scour-resistant interface enhancer and clear water for a certain period of time, followed by taking out and injecting therein the cement slurry. The maintenance of the coal cores is performed at 35° C. for 48 h and 72 h under normal pressure, and the shear strength of the two interfaces is measured. The soaking is conducted for 5 min and the maintenance is performed for 48 h with the same steps. The air tightness of two interfaces is tested through the self-developed sealing performance test device for the first and second interfaces of cementing, and the average value is taken from three measurements.

TABLE 16

Effect of scour-resistant interface enhancer on the cementing strength of two interfaces

| Soaking medium | Soaking time | Maintenance for 48 h | Maintenance for 72 h |
|---|---|---|---|
| Clear water | 1 min | 1.148 | 1.604 |
| | 5 min | 1.142 | 1.554 |
| | 10 min | 1.156 | 1.629 |
| Interface enhancer | 1 min | 1.263 | 1.826 |
| | 5 min | 1.448 | 2.054 |
| | 10 min | 1.479 | 2.103 |

TABLE 17

Effect of scour-resistant interface enhancer on air tightness of two interfaces of coalbed cement sheath

| No. | Breakthrough pressure under clear water soaking/MPa | Breakthrough pressure under interface enhancer soaking/MPa |
|---|---|---|
| 1 | 2.7 | 3.1 |
| 2 | 2.5 | 3.2 |
| 3 | 2.8 | 3.6 |
| Average value | 2.67 | 3.3 |

It can be seen from Table 16 and Table 17 that the cementing strength of two interfaces of the coal core soaked in the scour-resistant interface enhancer is significantly higher than that of the coal core soaked in clear water, and the cementing strength of two interfaces is greatly increased with the prolonging of the soaking time. The cementing strength after treatment for 5 min and the cementing strength after treatment for 10 min are similar, indicating that the effect of improving the cementing strength of two interface can be achieved after treatment with the cementing quality enhancer for 5 min. The scour-resistant interface enhancer can also significantly enhance the air tightness of two interfaces of coalbed cement sheath. Therefore, the scour-resistant interface enhancer can significantly improve the cementing quality of two interfaces of coal bed.

What is claimed is:

1. A scour-resistant interface enhancer, wherein the scour-resistant interface enhancer is a compound solution prepared by using a surfactant, said surfactant consisting of coconut amide ethoxylate-15 (CAEO-15), and using a silane coupling agent as solutes, and using a mixture of clear water and absolute ethanol as a solvent;
   a mass percentage of the surfactant CAEO-15 is 0.1%; and a mass percentage of the silane coupling agent is 0.3%.

2. The scour-resistant interface enhancer according to claim 1, wherein a mass ratio of the clear water to the absolute ethanol is 9:1.

3. A preparation method of the scour-resistant interface enhancer according to claim 1, comprising the specific steps of:

(1) mixing the clear water and the absolute ethanol in proportion to obtain a solution I;
(2) adding the surfactant to the solution I, dropwise adding the silane coupling agent under a low-speed stirring, and continuing the low-speed stirring for 15 min to obtain the scour-resistant interface enhancer.

\* \* \* \* \*